(12) United States Patent
Forbis

(10) Patent No.: US 7,547,844 B2
(45) Date of Patent: Jun. 16, 2009

(54) LOW PROFILE ELECTRICAL BOX

(76) Inventor: Robert C. Forbis, c/o Lawdock, 411 E. Wisconsin Ave., Milwaukee, WI (US) 53202

( * ) Notice: Subject to any disclaimer, the term of this patent is extended or adjusted under 35 U.S.C. 154(b) by 0 days.

(21) Appl. No.: 11/836,433

(22) Filed: Aug. 9, 2007

(65) Prior Publication Data

US 2008/0041606 A1 Feb. 21, 2008

Related U.S. Application Data

(60) Provisional application No. 60/837,670, filed on Aug. 15, 2006.

(51) Int. Cl.
*H02G 3/08* (2006.01)
(52) U.S. Cl. ............... 174/58; 174/50; 174/53; 174/50.52; 174/59; 248/906; 439/535
(58) Field of Classification Search ............ 174/50, 174/58, 53, 50.52, 59; 220/3.8, 4.02; 248/906, 248/343; 439/535; 361/600, 642
See application file for complete search history.

(56) References Cited

U.S. PATENT DOCUMENTS

| | | | |
|---|---|---|---|
| 4,927,039 A | 5/1990 | McNab | |
| 5,673,522 A | 10/1997 | Schilham | |
| 5,728,971 A * | 3/1998 | Nash | 174/50.52 |
| 5,796,037 A | 8/1998 | Young et al. | |
| 5,874,692 A | 2/1999 | Simmons | |
| 5,895,888 A | 4/1999 | Arenas et al. | |
| 6,265,662 B1 | 7/2001 | Riedy et al. | |
| 6,929,140 B2 | 8/2005 | Rose | |
| 7,151,218 B2 * | 12/2006 | Dinh | 174/58 |

OTHER PUBLICATIONS

U.S. Department of Housing and Urban Development, Concrete Masonry Homes: Recommended Practices, Sep. 1999.
International Search Report, PCT/US07/75860, Feb. 20, 2008, 2 pages.

* cited by examiner

*Primary Examiner*—Dhiru R Patel
(74) *Attorney, Agent, or Firm*—Quarles & Brady LLP

(57) ABSTRACT

An electrical box includes a first wall and a second wall spaced from the first wall. A periphery wall joins the first and second walls and defines a box volume therebetween. An opening formed in the first wall provides access to the box volume. A collar extending outwardly from the first wall. The collar defines a collar volume for receiving a device mounted thereto. The box volume extends laterally beyond the collar to provide a box volume independent of the opening.

4 Claims, 5 Drawing Sheets

US 7,547,844 B2

LOW PROFILE ELECTRICAL BOX

CROSS REFERENCES TO RELATED APPLICATIONS

This application claims the priority benefit of U.S. Provisional Patent Application No. 60/837,670 filed on Aug. 15, 2006.

STATEMENT REGARDING FEDERALLY SPONSORED RESEARCH

Not Applicable.

BACKGROUND OF THE INVENTION

This invention relates to electrical boxes for mounting electrical or optical devices to a wall, and in particular to a low profile electrical box suitable for use in narrow spaces between a masonry wall and a finished wall material.

Electrical boxes are used to mount electrical devices, such as outlets and switches, in walls of buildings, such as residential homes. Conductors are routed into the electrical boxes for connection to the electrical device mounted to the particular electrical box. The National Electrical Code (NEC) limits the volume of electrical boxes that can be filled with wires and devices mounted thereto. The NEC allocates a certain amount of cubic inches for each size wire and each device mounted in the box. In order to meet the code requirements, typical electrical boxes are nearly four inches deep which provides sufficient volume in the electrical box for the device and conductors.

A typical hollow non-masonry wall of a residential home includes a finished wall material affixed to spaced studs forming large cavities in the walls. These cavities between the studs are generally at least four inches deep which can easily accommodate the electrical boxes having a depth of nearly 4 inches. Masonry wall construction, however, introduces special challenges because of the typical lack of easy access to deep cavities in the wall for mounting the electrical boxes.

Masonry walls are typically finished by nailing furring strips to the wall, and then affixing a finish wall material, such as drywall or paneling, to the furring strips. The furring strips are typically less than four inches deep, and can have a depth of less than one inch to maximize the interior volume of the building. As a result, in order to use standard electrical boxes, holes must be broken out of the masonry wall to accommodate the depth of the standard electrical box. Breaking out the holes is labor intensive and expensive.

Shallow electrical boxes have been developed for use in spaces shallower than four inches. These shallow electrical boxes are wider than standard electrical boxes in order to provide sufficient volume for the conductors and the device mounted thereto. Unfortunately, these shallow electrical boxes require an unsightly large hole through the finished wall material to affix a non-standard cover over the electrical box or they do not provide sufficient volume to accommodate an electrical device and meet the code requirements. Therefore, a need exists for an improved low profile electrical box that can fit in a narrow space while providing sufficient volume to meet code requirements.

SUMMARY OF THE INVENTION

The present invention provides an electrical box including a first wall and a second wall spaced from the first wall. A periphery wall joins the first and second walls and defines a box volume therebetween. An opening formed in the first wall provides access to the box volume. A collar extending outwardly from the first wall surrounds the opening. The collar defines a collar volume for receiving a device.

A general objective of the present invention is to provide a low profile electrical box having a sufficient box volume to meet electrical codes. This objective is accomplished by providing an electrical box having a shallow box volume with a collar surrounding an opening into the box volume. The box volume extends laterally beyond the collar to provide sufficient box volume independent of the opening.

The foregoing and other objects and advantages of the invention will appear from the following description. In the description, reference is made to the accompanying drawings which form a part hereof, and in which there is shown by way of illustration a preferred embodiment of the invention.

Figure 1:
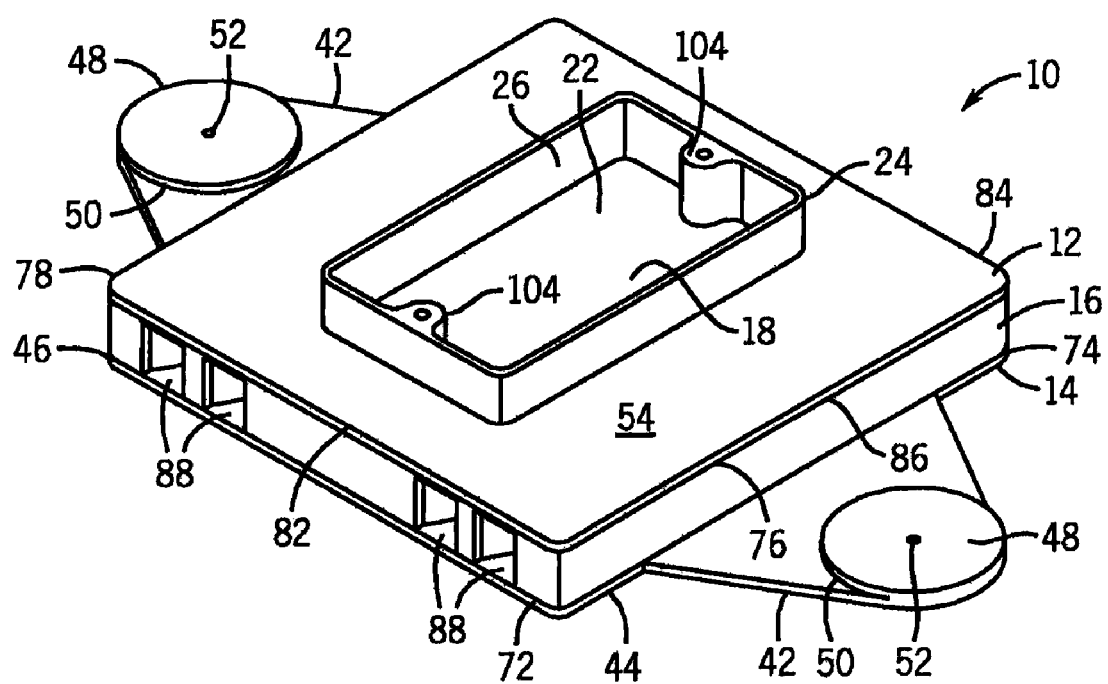
FIG. 1 is a perspective view of single gang electrical box incorporating the present invention.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is understood that the phraseology and terminology used herein is for the purpose of description and should not be regarded as limiting.

DESCRIPTION OF THE PREFERRED EMBODIMENT

Figure 2:
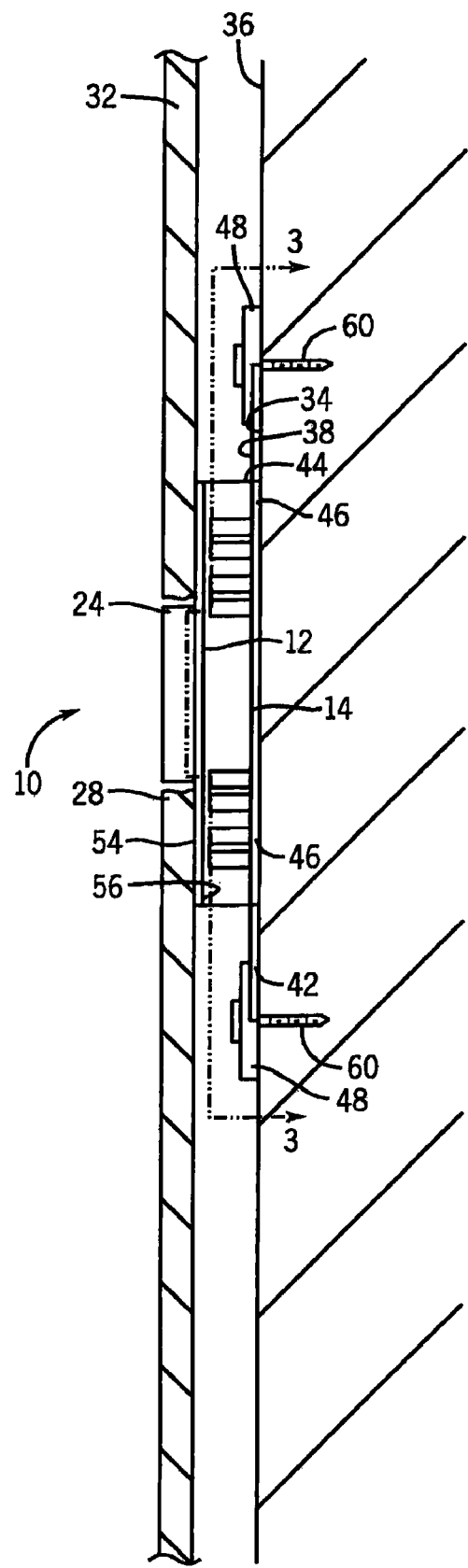
FIG. 2 is a top view of the electrical box of FIG. 1.
Figure 3:
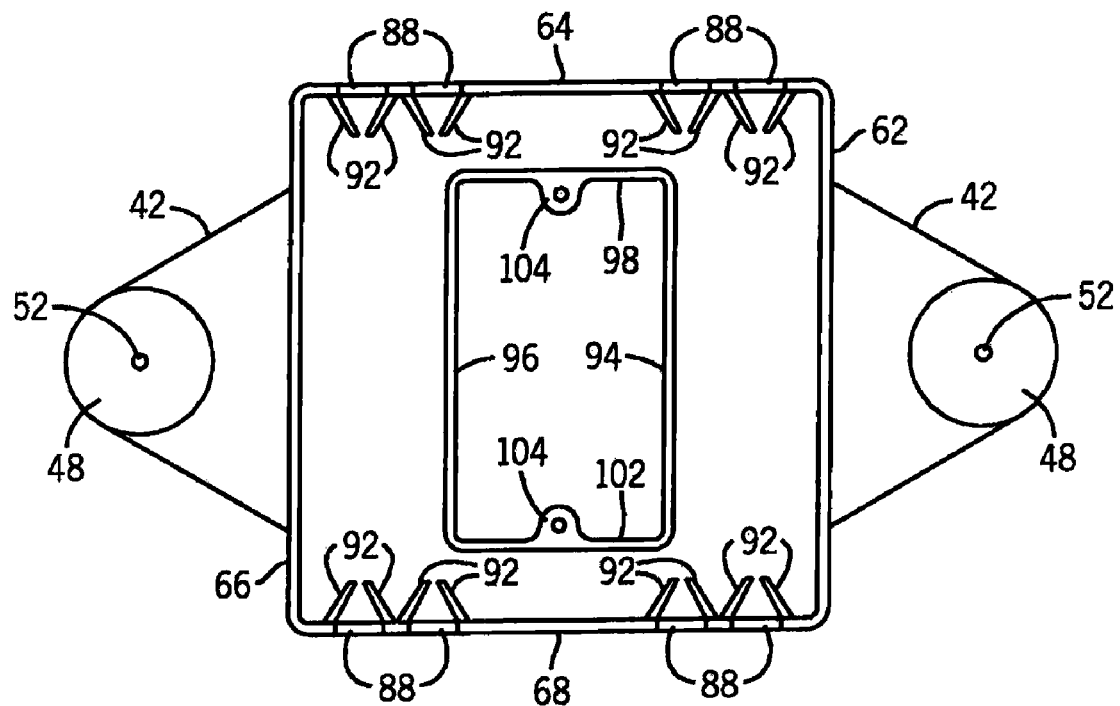
FIG. 3 is a cross sectional view along line 3-3 of FIG. 2.

As shown in FIGS. 1-3, a single gang electrical box 10 incorporating the present invention includes a front wall 12 spaced from a rear wall 14. The front and rear walls 12, 14 are joined by a periphery wall 16 which defines a box volume 18 therebetween. An opening 22 formed through the front wall 12 provides access to the box volume 18 through the front wall 12. A collar 24 surrounding the opening 22 defines a collar volume 26 extending outwardly from the front wall 12 for extending into a hole 28 formed through a finished wall material 32, such as drywall, paneling, and the like. An electrical or optical device (not shown), such as an electrical outlet, telephone jack, cable jack, switch, and the like, is received in the collar volume 26 for connection to conductors (not shown), such as wires, optic fibers, and the like, routed into the box volume 18. Advantageously, the box volume 18 extends laterally beyond the opening 22 to provide space for the conductors while minimizing the spacing between the front and rear walls 12, 14.

The rear wall 14 is preferably a flat plate formed from plastic, metal, and the like. An outwardly facing surface 34 of the rear wall 14 faces a mounting surface 36, such as a masonry wall, to which the electrical box 10 is mounted. An inwardly facing surface 38 of the rear wall 14 faces the front wall 12. The inwardly and outwardly facing surfaces 34, 38 are defined by edges 44, 46, 72, 74 of the rear wall 14.

Although four edges 44, 46, 72, 74 define the rectangular rear wall 14 of the embodiment disclosed herein, the rear wall can have any polygonal, circular, or free form shape, with any number of edges without departing from the scope of the invention.

Mounting tabs 42 formed as an integral part of the rear wall 14 extend laterally from opposing edges 44, 46 of the rear wall 14 for mounting the rear wall 14, and thus the electrical box 10, to the mounting surface 36 using fasteners 60. A mounting disc 48 formed at a distal end 50 of each mounting tab 42 includes a through hole 52 for receiving the fastener 60 therethrough. The fastener 60 can be any mechanical fastener known in the art, such as a nail, screw, bolt, and the like. Preferably, the fastener 60 is a masonry nail provided with the electrical box 10 and frictionally held in the through hole 52. Of course, the mounting tabs 42 can be eliminated, and the rear wall 14 can be mounted to the mounting surface 36 by adhesives applied to the outwardly facing surface 34 of the rear wall 14, or by fastening the rear wall 14 to the mounting surface 36 using mechanical fasteners extending through the rear wall 14 without departing from the scope of the invention. In addition, mounting tabs 42 can be provided extending from the other edges 72, 74 of the rear wall 14 without departing from the scope of the invention. Likewise, mounting tabs 42 can be provided extending from the periphery wall 16 and/or front wall 12 to mount the front wall 12 to the mounting surface 36 independently of the rear wall 14 without departing from the scope of the invention.

The front wall 12 is spaced from the rear wall 14, and is preferably a flat plate formed from plastic, metal, and the like. An outwardly facing surface 54 of the front wall 12 faces the finished wall material 32. An inwardly facing surface 56 of the front wall 12 faces the rear wall 14. Preferably, the front wall 12 is spaced from the rear wall 14 no more than about 1.0 inches. Most preferably, the front wall 12 is spaced from the rear wall 14 no more than about 0.5 inches to minimize the overall depth of the electrical box 10, and the front and rear walls 12, 14 are approximately 5.4375 inches high and 5.4375 inches wide to provide sufficient box volume to meet NEC codes. As a result, when the front and rear walls 12, 14 have a nominal thickness of less than 0.125 inches, the electrical box 10 can easily fit in a space of 0.75 inches deep. If additional box volume is desired, larger front and rear walls, 12, 14 can be provided without departing from the scope of the invention.

The periphery wall 16 joins the front and rear walls 12, 14 and defines the box volume 18 therebetween. In the embodiment disclosed in FIGS. 1-4, the periphery wall 16 is formed from a plurality of sidewalls 62, 64, 66, 68 adjacent edges 44, 46, 72, 74, 76, 78, 82, 84 of the front and rear walls 12, 14. Of course, the periphery wall 16 can be spaced inwardly from the edges 44, 46, 72, 74, 76, 78, 82, 84 of either front or rear wall 12, 14 without departing from the scope of the invention. Moreover, the periphery wall 16 is preferably formed as an integral part of one of the front and rear walls 12, 14, and has a distal edge 86 abutting the other of the front and rear walls 12, 14.

Inlets 88 formed in the periphery wall 16 receive the conductors therethrough for connection to the electrical or optical device. Angled barbs 92 extending over each inlet 88 engage the conductor extending therethrough to resist pulling the conductor out of the box volume 18. Although inlets 88 with or without barbs 92 formed in the periphery wall 16 are preferred, inlets 88 can be formed in the front and/or rear walls 12, 14 without departing from the scope of the invention.

The opening 22 formed through the front wall 12 provides access to the box volume 18 through the front wall 12. In the embodiment disclosed in FIGS. 1-3, the opening 22 has four sides 94, 96, 98, 102 substantially parallel to each edge 76, 78, 82, 84 of the front wall 12, and each opening side 94, 96, 98, 102 is spaced inwardly from the one of the front plate edges 76, 78, 82, 84 and thus the periphery wall 16. The opening 22, however, can have any shape with one or more sides coextensive with a portion of the periphery wall 16 without departing from the scope of the invention. Importantly, however, the box volume 18 extends laterally beyond at least one side 94, 96, 98, 102 of the opening 22 to provide a box volume 18 greater than a volume defined by the periphery wall 16 being coextensive with all of the sides 94, 96, 98, 102 of the opening 22. Advantageously, the front and rear walls 12, 14 can be sized to provide any desired box volume independent of the opening 22.

The collar 24 surrounding the opening 22 extends outwardly from the outwardly facing surface 54 of the front wall 12, and defines a collar volume 26 for receiving the electrical or optical device therethrough. Advantageously, the collar 24 mounts the device forwardly of the front wall 12, such that only a portion of the device extends into the box volume 18, to provide room for the conductors. Screw bosses 104 extend into the collar volume 26 for receiving fasteners, such as screws, which mount the device extending through the collar volume 26 into the box volume 18. Preferably, the collar 24 defines the perimeter of the opening 22, and extends outwardly from the front wall 12 outwardly facing surface 54 no more than about 0.5 inches. In addition, the collar 24 can extend into the box volume 18 without departing from the scope of the invention. Preferably, the collar 24 for the single gang electrical box 10 has a standard rectangular shape approximately 3.75 inches high and 2.25 inches wide which can be covered with a standard cover plate.

In use, the electrical box 10 is mounted to the mounting surface 36 using the appropriate fastener means, and the desired conductors are routed into the box volume 18. The finished wall material 32 is then fixed over the electrical box 10 with the collar 24 extending into the hole 28 formed in the finished wall material 32. The conductors are then connected to the device, and the device is mounted to the electrical box 10 by threadably engaging screws with the screw bosses 104.

The electrical box 10 is preferably made by molding the rear wall 14 with an integral periphery wall 16 extending from the inwardly facing surface 38 of the rear wall 14. The front wall 12 including the opening 22 and collar 24 is then joined to the distal edge of the periphery wall 16. In one embodiment, the distal edge 86 of the periphery wall 16 is joined to the inwardly facing surface 56 of the front wall 12 using an adhesive or ultrasonic welding.

Figure 4:
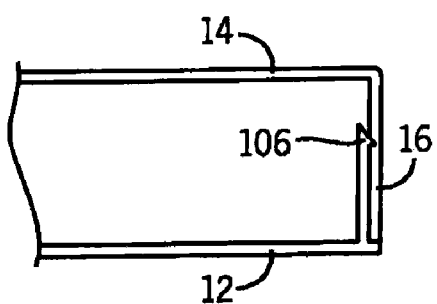
FIG. 4 is another embodiment of an electrical box incorporating the present invention.
Figure 5:
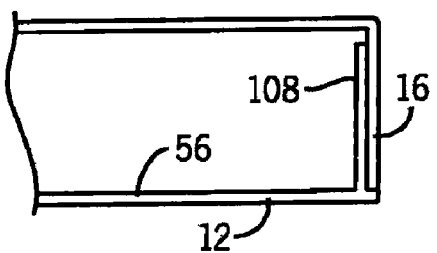
FIG. 5 is yet another embodiment of an electrical box incorporating the present invention.

In another embodiment shown in FIG. 4, the front wall 12 includes barbs 106 which engage the periphery wall 16 to join the front wall 12 to the periphery wall 16 using a snap fit. Alternatively, as shown in FIG. 5, one or more auxiliary walls 108 extend from the inwardly facing surface 56 of the front wall 12 which frictionally engage the periphery wall 16 to join the front wall 12 to the periphery wall 16. Advantageously, if the electrical box 10 is formed from two pieces, such as described above with respect to FIGS. 5 and 6, the rear wall 14 can be mounted to the mounting surface 36 and the conductors can be routed into the box volume 18 prior to fixing the front wall 12 relative to the rear wall 14 without departing from the scope of the invention. Of course, the periphery wall 16 can be formed as an integral part of the front wall 12 with the barbs 106 or auxiliary walls 108 extending from the rear wall 14 without departing from the scope of the invention.

Figure 6:
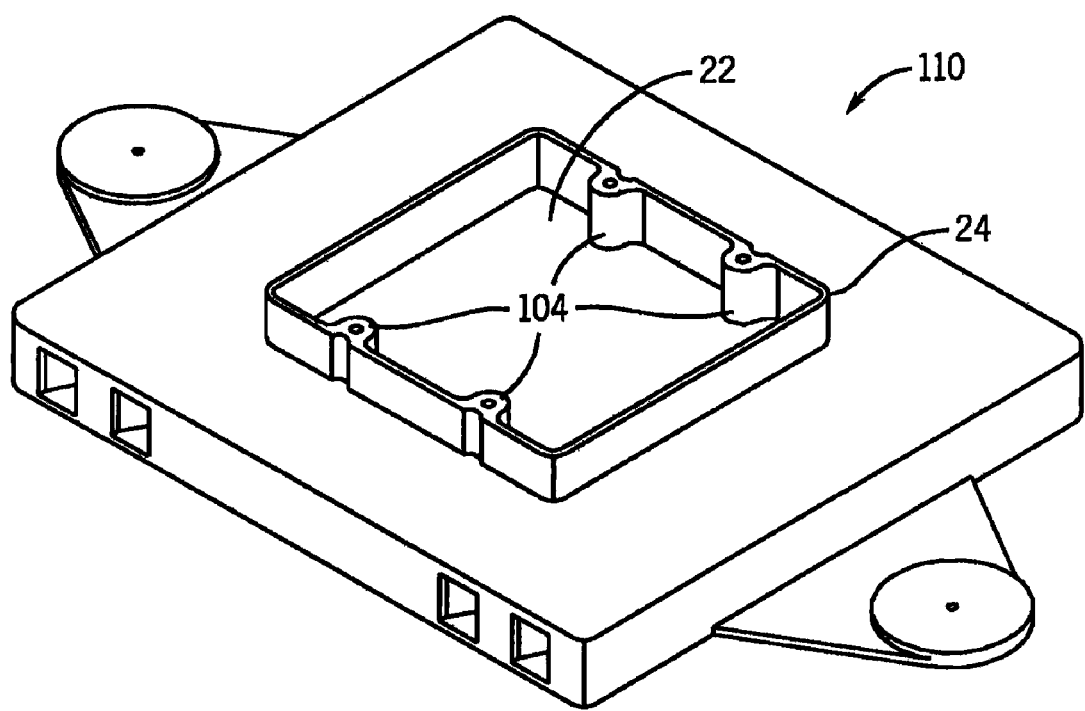
FIGS. 6-8 are perspective views of multi-gang electrical boxes incorporating the present invention.

In another embodiment of the present invention shown in FIG. 6, a double gang electrical box 110 is substantially identical to the single gang electrical box 10 described above with the exception of the opening 22 and collar 24 being sized for accommodating two single gang devices or a double gang device. Additional screw bosses 104 extending into the collar volume 26 are provided for mounting the double gang device or the additional single gang device. Of course, the opening 22 and collar 24 can be sized for accommodating any number of devices without departing from the scope of the invention.

Figure 7:
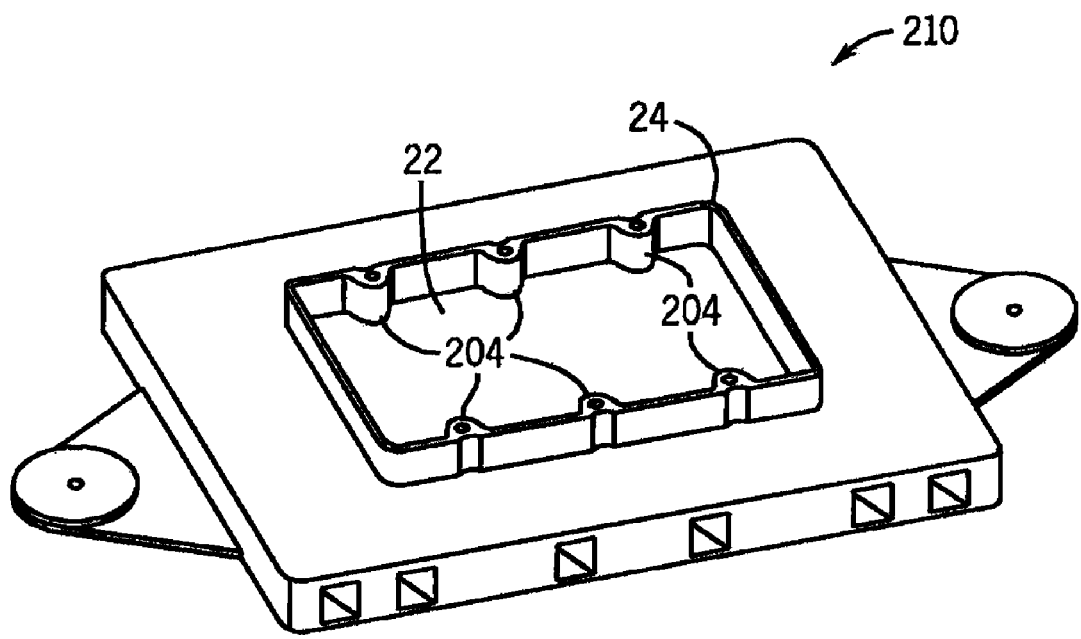

FIG. 7 shows a triple gang electrical box 210 substantially identical to the single gang electrical box 10 described above with the exception of the opening 22 and collar 24 being sized for accommodating three single gang devices, a double and single gang device, or a triple gang device. Additional screw bosses 204 extending into the collar volume 26 are provided for mounting the triple gang device, a single and double dang device, or the additional single gang devices. As in the double gang electrical box described above, the opening 22 and collar 24 can be sized for accommodating any number of devices without departing from the scope of the invention.

Figure 8:
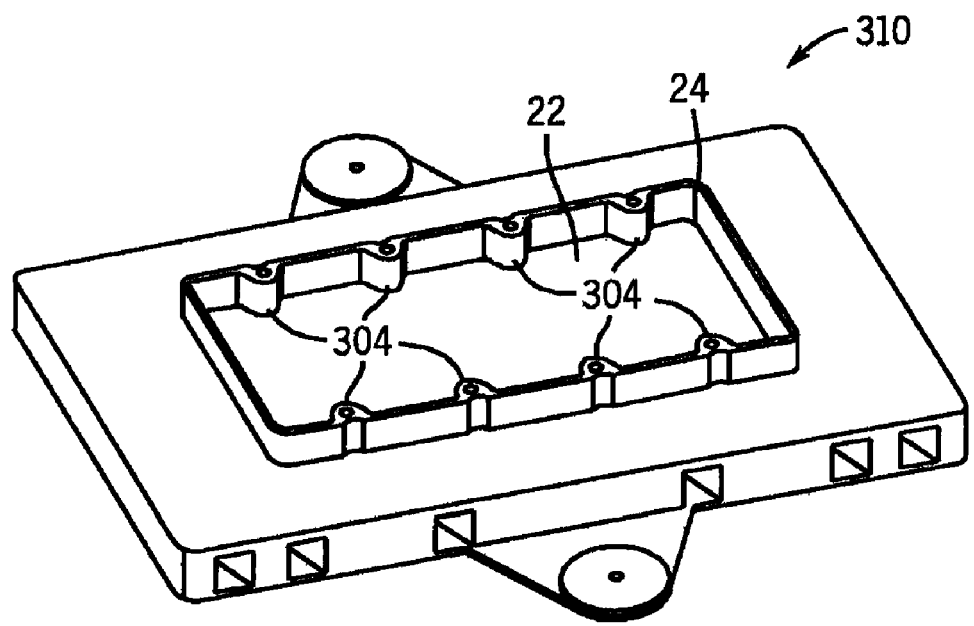

FIG. 8 shows a quadruple gang electrical box 310 substantially identical to the single gang electrical box 10 described above with the exception of the opening 22 and collar 24 being sized for accommodating four gang devices, a combination of double, triple, and/or single gang devices, or a quadruple gang device. Additional screw bosses 204 extending into the collar volume 26 are provided for mounting the electrical device or devices. As in the double and triple gang electrical boxes described above, the opening 22 and collar 24 can be sized for accommodating any number of devices without departing from the scope of the invention.

While there has been shown and described what are at present considered the preferred embodiment of the invention, it will be obvious to those skilled in the art that various changes and modifications can be made therein without departing from the scope of the invention defined by the appended claims. Therefore, various alternatives and embodiments are contemplated as being within the scope of the following claims particularly pointing out and distinctly claiming the subject matter regarded as the invention.

I claim:

1. An electrical box comprising:
    a first wall having a first surface and a second surface, and including a opening formed therethrough;
    a collar surrounding said opening and extending away from said first surface;
    a second wall spaced from said second surface of said first wall;
    a periphery wall joining said first and second walls and defining a volume therebetween, said volume extending laterally beyond said collar;
    a mounting tab extending from one of said first wall, said second wall, and said periphery wall for fastening said electrical box to a mounting surface; said mounting tab including a mounting disc disposed at a distal end of the mounting tab having a through hole for receiving a fastener;
    a fastener frictionally held in said through hole prior to attaching said electrical box to the mounting surface; and
    at least one inlet formed in said periphery wall for receiving a conductor therethrough including an opening and at least one angled barb extending over said opening to engage said conductor so as to resist pulling forces applied to said conductor.

2. The electrical box as in claim 1, in which said collar is spaced inwardly from at least a portion of said periphery wall and defines a collar volume for receiving a device extending into said box volume through said opening.

3. The electrical box as in claim 1, in which at least a portion of said periphery wall is formed as an integral part of one of said first and second walls.

4. The electrical box as in claim 3, in which said periphery wall engages barbed structure forms part of the other of said first and second walls to join said first and second walls.

* * * * *